United States Patent Office 3,398,874
Patented Aug. 27, 1968

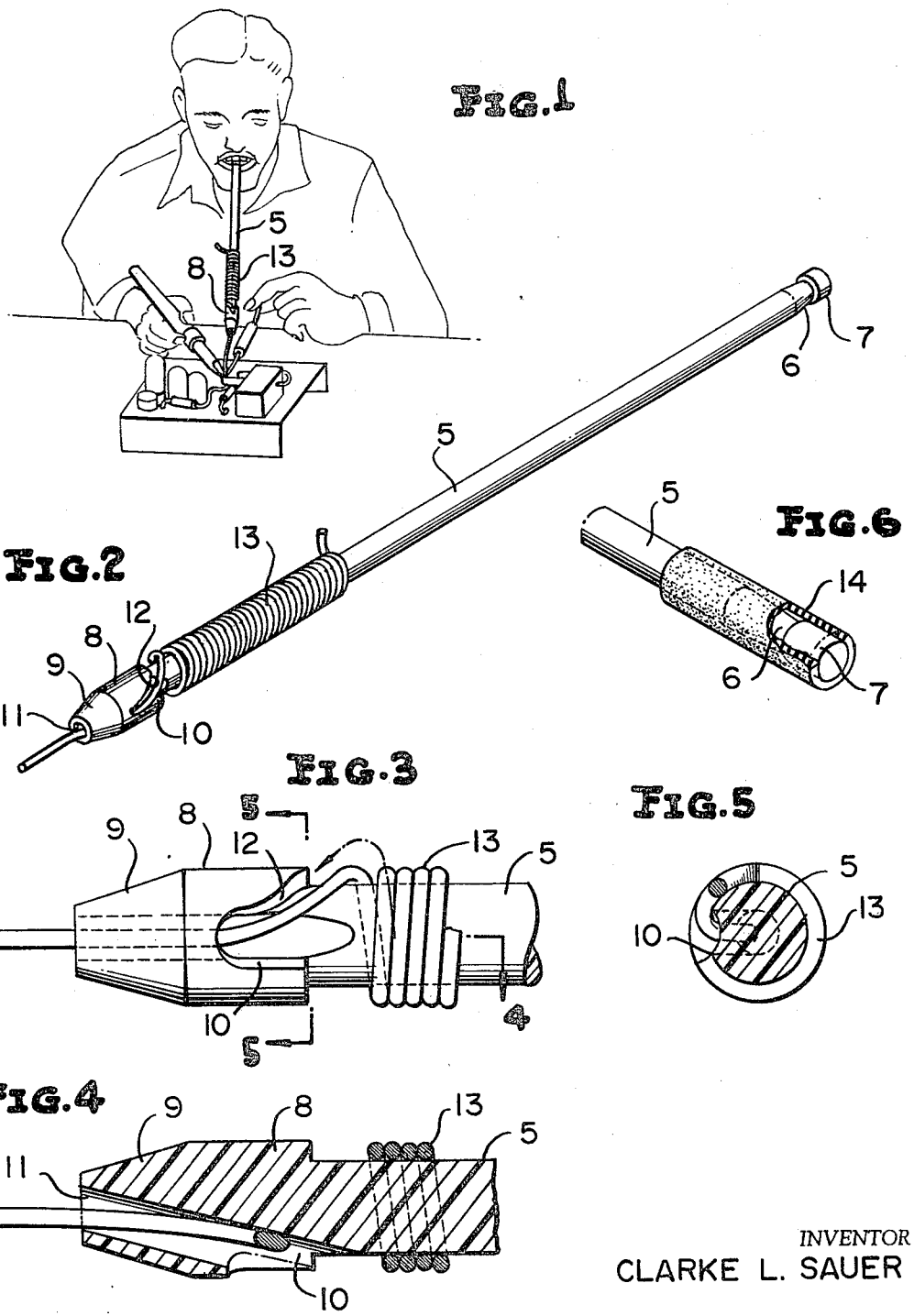

3,398,874
SOLDER HOLDER AND DISPENSER
Clarke L. Sauer, 2959 Farnam St.,
Omaha, Nebr. 68131
Filed Jan. 6, 1967, Ser. No. 607,840
8 Claims. (Cl. 228—57)

ABSTRACT OF THE DISCLOSURE

A solder wire dispenser including a rod for supporting a soldler wire with means at one end of the rod to receive and guide one end of the solder wire to solder location.

---

This invention relates to a solder holder and dispenser.

A solder wire dispenser comprising a rod having a coil of solder wire wound on the rod with a guide channel formed in the side of the rod adjacent one end having communication with a bore in the end of the rod through which one end of the solder wire is dispensed while the opposite end of the rod is held in the mouth of the welder, thus leaving the hands of the welder free to hold the soldering iron and work.

It is an object of the invention to provide a rod of plastic material adapted to be held in the mouth of the welder having an enlarged head at its free end provided with a guide channel on the exterior of the head leading to a central bore in the end of the rod through which the end of the solder wire is drawn, the solder wire being coiled around the rod above the head.

Other objects and advantages of the invention will be apparent during the course of the following description.

In the accompanying drawing forming a part of this specification,

FIG. 1 is a view illustrating how the device is used.

FIG. 2 is a perspective view of the device.

FIG. 3 is a detail enlarged view of the dispensing end of the holder.

FIG. 4 is a section taken on line 4—4 of FIG. 3,

FIG. 5 is a cross section taken on line 5—5 of FIG. 3, and,

FIG. 6 is perspective view of a modified form of the end of the rod which is gripped between the teeth.

In the drawing, wherein for the purpose of illustration a preferred embodiment of the invention is shown the numeral 5 denotes a round rod of plastic or other suitable material which adjacent one end is slightly tapered, as at 6, forming a collar 7 at the end to retain the rod in the mouth of the welder when gripped between the teeth. The opposite end of the rod is formed with an enlarged head 8 which is tapered at its free end, as at 9. The inner end of the head 8 is provided in its side with a guide channel 10 inclined downwardly through the head into communication with the bore 11 in the end of the rod, the upper end of the channel having a side wall 12 laterally curved to the right or left. A coil of solder wire 13 is wound around rod 5 adjacent the head 8 and the free end of the wire is guided by the channel 10 through the bore 11 so that it protrudes from the end of the rod. If desired the end of the rod which is gripped between the teeth may be covered with a sleeve 14 of flexible material which makes it more comfortable to hold in the mouth over long periods of time.

In use, the coil of solder wire 13 is wound around the rod 5 adjacent the head 8 and the end of the wire adjacent the head is inserted in the channel 10 and through the bore 9 to project from the end of the rod. By pulling on the end of the wire, the wire is unwound from the rod and is guided by the channel 10 into and through the bore 9. When performing a welding operation the welder grips the end of the rod in front of the collar 7 between his teeth and thereby holds the welding wire in position to perform his work with both of his hands being free.

Having thus described my invention, I claim:

1. A solder holder and dispenser comprising a rod having one end adapted to be gripped by the mouth, a bore in the opposite end of said rod, a coil of solder wire wound on said rod, and means for guiding said solder wire through the side of said rod into said bore.

2. A solder holder and dispenser as described in claim 1, wherein said means for guiding said solder wire is a channel formed in the side of an enlarged head and communicating with said bore.

3. A solder holder and dispenser as described in claim 2 wherein the channel is curved laterally.

4. A solder holder and dispenser as described in claim 2 wherein the channel is inclined downwardly into communication with said bore.

5. A solder holder and dispenser as described in claim 1 wherein said means for guiding said solder wire is a channel formed in the side of said rod having communication with said bore.

6. A solder holder and dispenser as described in claim 1 wherein the end of the rod gripped by the mouth has a collar formed thereon.

7. A solder holder and dispenser as described in claim 1 wherein the end of the rod gripped by the mouth is covered with a sleeve of flexible material.

8. A solder holder and dispenser as described in claim 1 wherein the means for guiding said solder wire is an inclined channel formed in the side of said bar having communication with said bore, the upper end of said channel having one of its walls curved laterally.

References Cited

UNITED STATES PATENTS

| 1,929,666 | 10/1933 | Williams | 228—57 |
| 3,024,752 | 3/1962 | Marsh | 228—57 |
| 3,356,273 | 12/1967 | Wallace | 228—52 |

RICHARD H. EANES, Jr., *Primary Examiner.*